United States Patent [19]

Moritan et al.

[11] 3,784,761

[45] Jan. 8, 1974

[54] TAPE AUTO-LOADING RECORDING AND REPRODUCING APPARATUS

[75] Inventors: Norishige Moritan, Sagamihara; Ikuro Moriya, Zushi; Junichi Ura; Makoto Koono, both of Yokohama, all of Japan

[73] Assignee: Victor Company of Japan, Ltd., Yokohama City, Japan

[22] Filed: Apr. 21, 1972

[21] Appl. No.: 246,301

[30] Foreign Application Priority Data

| | | |
|---|---|---|
| Apr. 24, 1971 | Japan | 46/26438 |
| June 5, 1971 | Japan | 46/39558 |
| June 6, 1971 | Japan | 46/39559 |
| June 5, 1971 | Japan | 46/47217 (utility model) |

[52] U.S. Cl. ................. 179/100.2 ZA, 178/100.2 T

[51] Int. Cl. ........................ G11b 15/66, G11b 23/04

[58] Field of Search ............ 179/100.2 ZA, 100.2 T, 179/100.2 MD, 100.2 Z; 242/55.19 A; 226/91; 274/4 E

[56] References Cited

UNITED STATES PATENTS

| | | | |
|---|---|---|---|
| 3,681,539 | 8/1972 | Eibensteiner | 179/100.2 ZA |
| 3,673,348 | 6/1972 | Larkin | 179/100.2 ZA |
| 3,643,038 | 2/1972 | Sato | 179/100.2 T |
| 3,678,213 | 7/1972 | Sato | 179/100.2 ZA |
| 3,665,120 | 5/1972 | Larkin | 179/100.2 ZA |
| 3,647,984 | 3/1972 | Watanabe | 179/100.2 ZA |

*Primary Examiner*—Vincent P. Canney
*Assistant Examiner*—Alfred H. Eddleman
*Attorney*—Louis Bernat

[57] ABSTRACT

A tape auto-loading recording and reproducing apparatus comprises means for drawing tape from the interior of a cassette to the outside, through a tape guide member which enters the loop of the tape thus drawn out. As the guide is about to pass through this loop, it engages the tape and pulls it around. A rotating ring-shaped member provided with this tape guide member is adapted to rotate while surrounding a guide drum and, moreover, with an inclination. The tape drawn out of the cassette is pulled around by the tape guide member together with the rotation of the ring-shaped member and is loaded in a predetermined tape travel path, including a passage wherein the tape is caused to contact the guide drum over a specific range of angle.

8 Claims, 13 Drawing Figures

TAPE AUTO-LOADING RECORDING AND REPRODUCING APPARATUS

BACKGROUND OF THE INVENTION

This invention relates to a tape auto-loading type recording and reproducing apparatus and, more particularly, to a recording and reproducing apparatus. From a cassette containing a tape wound on spools, the tape is pulled out and loaded in a specific tape travel path. The path includes a passage wherein the tape obliquely make contact with a guide drum having a rotary head, the contact being made over a specific range of angle.

In general, in a so-called helical-scan type magnetic recording and reproducing apparatus (hereinafter referred to simply as a VTR), it is necessary for the magnetic tape to be wound around the peripheral surface of a guide drum containing a rotary magnetic head. The tape wraps over a specific range (e.g., an angular range slightly greater than 180° in the case of a two-head system), with an oblique contact relative to the rotational plane of the rotary magnetic head.

On the other hand, in a VTR of the so-called openreel type, it is necessary, at the time of its use, to manually unwind the tape from the supply reel. After guiding the tape end along a specific tape travel path, it is brought into engagement with a take-up reel, for winding and taking up the tape. This procedure has been very troublesome and time consuming. Accordingly, there has been proposed a VTR of a so-called autothreading type in which use is made of a cartridge containing a supply reel on which a tape has been wound. The tape is provided at its free extremity with a tape leader of relatively hard yet flexible material, which is automatically sent out from the cartridge. It automatically travels along a specific tape travel path, and automatically engages a take-up reel, thereby to accomplish an automatic loading of the tape following the tape leader into the specific tape travel path.

The tape travel path in a VTR has a curved configuration which is more complicated than that in an audio signal recording and reproducing apparatus (e.g., a so-called ordinary tape recorder). Consequently, in a VTR of the above mentioned auto-threading type, it is difficult to cause the tape leader to travel accurately and positively along the specific complicated tape travel path and to cause the tape which has thus travelled to make positive engagement with the take-up reel.

Accordingly, it has been considered desirable to use tape cassettes of the type containing supply and take-up spools to which the two ends of a tape are respectively fixed. A specific length of the tape is wound beforehand around the supply reel. There has been a demand for the development of this type of cassette. When a tape cassette of this type is used in of VTR of the helical scan type, it is necessary to pull the tape in the span between the supply and take-up spools out of the cassette interior and to cause the part of the tape thus pulled out to contact the guide drum obliquely over a certain range of angle.

In order to pull the tape out of the cassette interior, an opening must be provided in the front or leading surface of the cassette. If this opening is large, however, it tends to give rise to trouble as by allowing the infiltration of dust into the cassette when it is not being used and the unintentional escape of the tape through this opening from the cassette interior during transportation. Accordingly, it is desirable that the opening formed in the cassette, for drawing out of tape, be made as narrow as possible.

A further problem arises from the trend toward miniaturization of ordinary cassettes, particularly in their thickness dimension. In accordance with this trend, the organization of parts within the cassette is so designed that the supply and take-up spools are disposed in substantially the same plane. For this reason, excessive and abnormal stresses such as uneven stretching and twisting tend to be imposed on the tape during its travel path wherein it is drawn out from the supply spool, wrapped obliquely around the guide drum, and then wound around the take-up spool. Therefore, the tape travel path must be devised to prevent the imposition of these stresses on the tape.

SUMMARY OF THE INVENTION

Accordingly, a general object of the present invention is to provide a new and advanced tape autoloading recording and reproducing apparatus in which the above described requirements are fulfilled.

More specifically, an object of the invention is to provide a recording and reproducing apparatus capable of accomplishing automatically the tape loading operation of drawing the tape from a cassette containing tape supply and take-up spools and causing it to follow a specific tape travel path including a passage wherein the tape is caused to contact and wrap around a guide drum over a specific interval of angle.

Another object of the invention is to provide a tape auto-loading recording and reproducing apparatus having means capable of drawing a tape positively out of a cassette through a relatively small and narrow opening formed therein and means for directing the tape thus drawn out along a specific tape travel path in a smooth and positive manner.

Still another object of the invention is to provide a recording and reproducing apparatus capable of accomplishing automatic tape loading in a smooth manner without imparting excessive stress to the tape in the formation of a tape travel path such that after the tape drawn out from the supply spool of a cassette has been caused to contact and wrap around obliquely a guide drum, the tape is led to the take-up spool lying within substantially the same plane as the supply spool.

A further object of the invention is to provide a tape auto-loading mechanism of a construction wherein a tape drawing-out arm for drawing the tape out of a cassette can extend and retract, as a whole structure. Therefore, it can operate within a relatively narrow range of rotational angle. Moreover, the tape which has been drawn out forms a tape loop which can be easily engaged by tape drawing and wrapping means.

A still further object of the invention is to provide a tape auto-loading recording and reproducing apparatus having an organization such that the axes of a guide post and a pinch roller rotating integrally with tape drawing and wrapping means become exactly parallel to the axis of a capstan during the recording or reproducing mode of operation.

An additional object of the invention is to provide a tape auto-loading recording and reproducing apparatus capable of accomplishing smooth fast forwarding or rewinding of the tape in a certain state, along the specific tape travel path irrespective of the complex nature of the specific tape travel path.

Further objects and features of the invention will be apparent from the following detailed description with respect to preferred embodiments of the invention when read in conjunction with the accompanying drawings, throughout which like parts are designated by like reference numerals.

DETAILED DESCRIPTION

Figure 1:
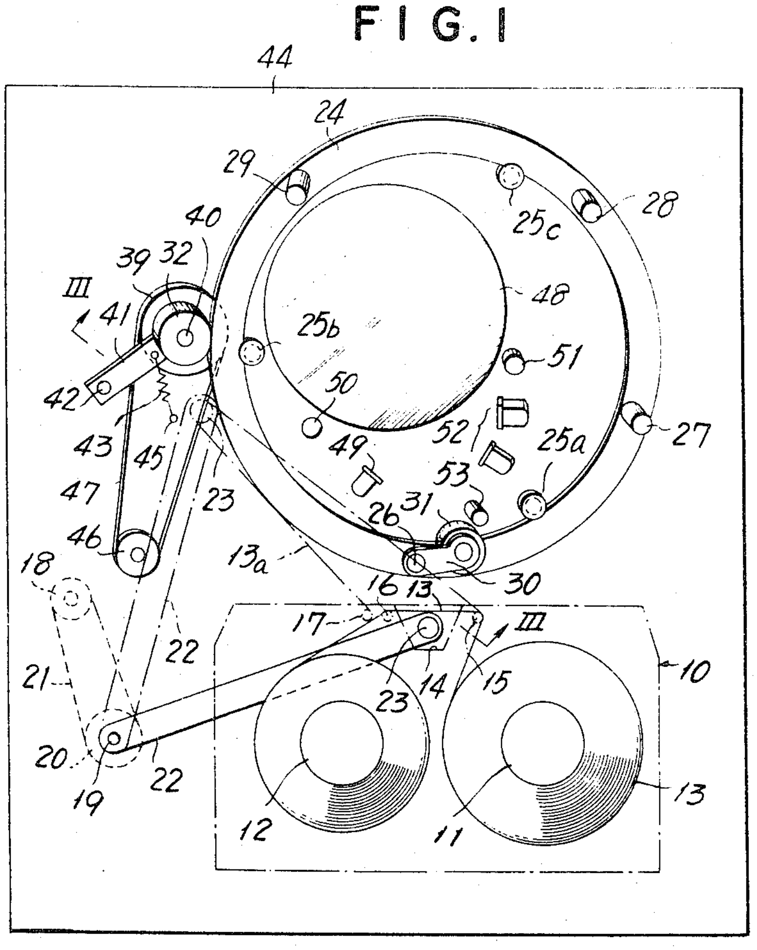
FIG. 1 is a plan view showing a first embodiment of a tape auto-loading recording and reproducing apparatus, according to the invention, here shown in a state wherein a cassette is inserted in place, but the loading of the tape has not been completed.
Figure 2:
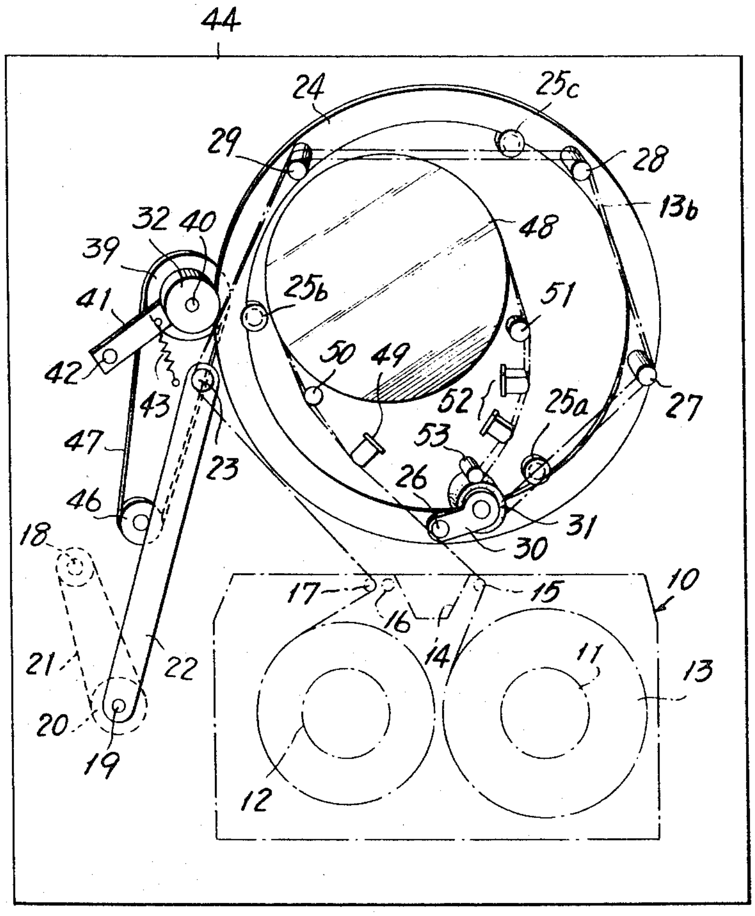
FIG. 2 is a plan view showing the apparatus of FIG. 1 in a state at the completion of tape auto-loading.
Figure 3:
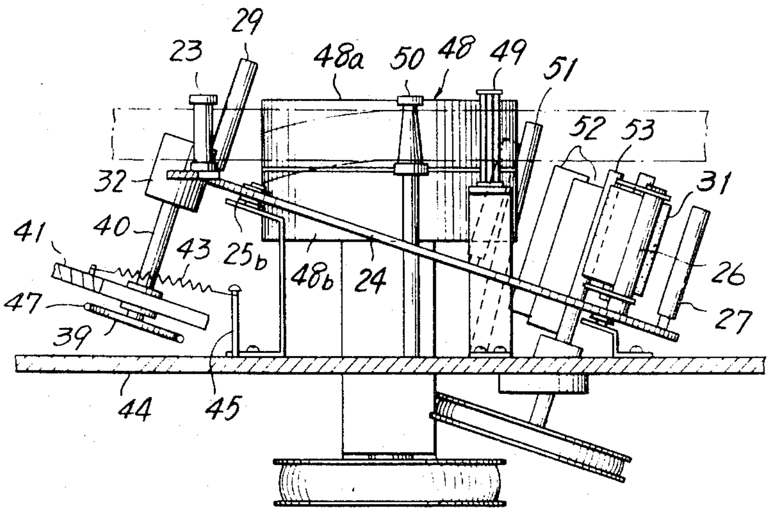
FIG. 3 is a fragmentary section taken along the line III—III in FIG. 1 as viewed in the arrow direction.
Figure 4:
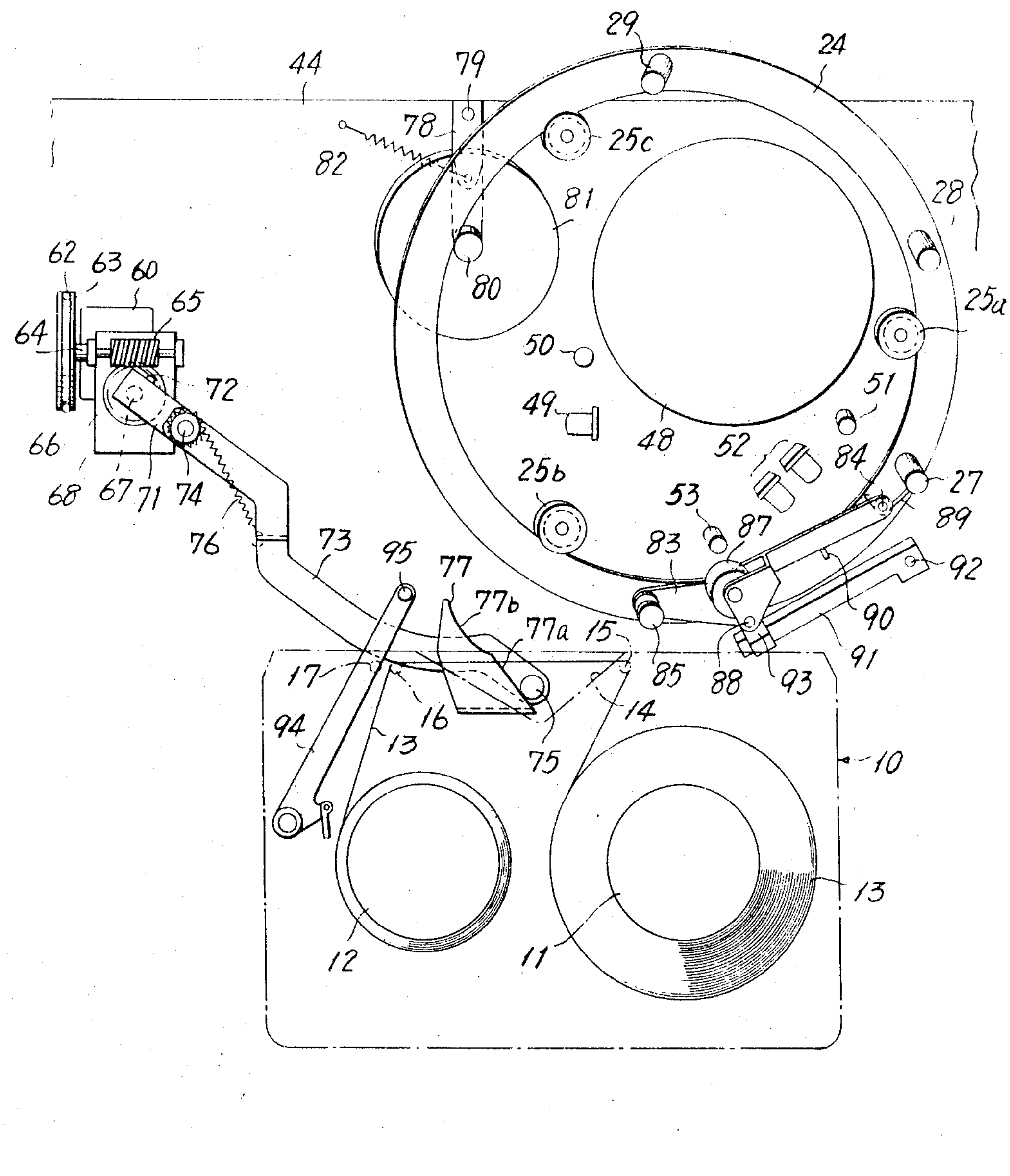
FIG. 4 is a plan view showing a second embodiment of the tape auto-loading recording and reproducing apparatus according to the invention.

Referring first to FIGS. 1, 2 and 3, the first embodiment is illustrated therein. The tape auto-loading recording and reproducing apparatus according to the invention is adapted to accommodate a tape cassette 10 containing therein a tape-supply spool 11, a tape take-up spool 12, and a magnetic tape 13 wound on the two spools 11 and 12. In the front surface casing of the tape cassette 10 and the lower cover thereof, there is provided an opening 14. Within the casing, tape guide pins 15, 16 and 17 are fixed at their lower ends to the lower cover. The tape 13 is wound on the supply spool 11 and is guided by the pin 15, past the opening 14, and between the pins 16 and 17. From there it is wound on the take-up spool 12. The magnetic face of the tape 13 passing by the opening 14 is directed outwardly at the front face of the cassette casing. The opening 14 at its part in the casing lower cover extends to the vicinity of the inner side of the pins 15 and 16 and at its part in the casing front face extends to the vicinity of the outer side of the pins 15 and 17. This opening 14 is made relatively narrow so as to reduce the amount of dust infiltrating therethrough into the cassette.

In the recording and reproducing apparatus and outside of the cassette are a first sprocket 18 driven in rotation by a motor (not shown), another sprocket 20 rotating as a unit with a shaft 19, and an endless belt 21, such as a ladder chain or a timing belt, stretched around and intercoupling the sprockets 18 and 20. The shaft 19 is fixed to one end of a tape draw-out lever 22. The other end of lever 22 is provided with a fixed guide post 23 for drawing out and guiding tape from the cassette.

The apparatus is further provided with a rotating ring 24, which is held at its inner periphery in a freely rotatable manner by three holding rollers 25*a*, 25*b* and 25*c*. As is well shown in FIG. 3, the rotating ring 24 is inclined downwardly to the right and obliquely lower part thereof as viewed in FIGS. 1 and 2. The rotating ring 24 bears, on its upper surface, guide pins 26, 27, 28 and 29 fixed thereon. A bracket 30 is pivotally supported at one end on the guide pin 26. At its other end it rotatably supports a pinch roller 31. The bracket 30 is continually urged by a spring (not shown) to rotate in the counterclockwise direction about the guide pin 26. It is limited from rotating beyond a certain angular position. While only a single pinch roller 31 is privided in this embodiment, two pinch rollers for simultaneously pressing the tape against the capstan may be employed for the purpose of driving the tape with even high stability and positiveness. In contrast to the guide pins 26, 27 and 28 which are embedded perpendicularly relative the rotating ring 24, the guide pin 29 is embedded with an inclination relative to the rotating ring 24 in order to vary the height and direction of the tape.

The rotating ring 24 is driven by a ring driving roller 32 pressed against the outer periphery thereof. The ring driving roller 32 and a sprocket 39 are coaxially fixed to rotate as a unit on a common shaft 40 rotatably supported on one end of a lever 41. The lever 41 at its other end is rotatably supported on a shaft 42 and is urged rotationally in the clockwise direction by a tension spring 43 stretched between the lever 41 and a pin 45 embedded in a chassis base 44 of the apparatus, thereby to cause the ring driving roller 32 to press against the rotating ring 24 with a specific pressing force. The sprocket 39 and a sprocket 46 is driven by the same motor that drives the aforementioned sprocket 18; or a separate motor (not shown) may be used. Sprockets 39, 46 are intercoupled by an endless belt 47 stretched therearound.

In a region surrounded by the rotating ring 24, there is provided a guide drum 48 with an axis which is either perpendicular or slightly inclined to the chassis base 44. The guide drum comprises upper and lower guide drums 48*a* and 48*b* and has therewithin two rotating magnetic heads installed in a manner such that the head tips appear through a gap between the upper and lower guide drums. For this guide drum 48, an arrangement may also be adopted wherein a rotating head is mounted on the upper guide drum, which is adapted to rotate, while the lower guide drum is held stationary. In another possible arrangement, the guide drum is not divided into upper and lower guide drums, and the entire guide drum rotates with a magnetic head mounted thereon.

Also mounted on chassis base 44 is an erasing magnetic head 49 and guide posts 44, 51 located in a region surrounded by the rotating ring 24, and along the intended path of tape travel. The guide post 50 has a conical part which is perpendicular to the chassis base 44. A magnetic head block 52, which provides for audio singnals and control signals, and a guide post 53 are perpendicular to the plane of the ring 24 and are therefore inclined relative to the chassis base 44.

The tape auto-loading operation of the apparatus of the above described organization, according to the invention, is accomplished as follows. When a cassette 10 is placed from above the chassis base 44 into the designed position in the recording and reproducing apparatus, as indicated in FIG. 1, the guide post 23 fits into the interior of the cassette 10 through the lower side of the opening 14. As a result of the relative movement, it is positioned on the inner side of the tape 13. At the same time, the spools 11 and 12 respectively engage reel tables on the apparatus side.

Then, with the apparatus in this state, the tape loading mode button of the apparatus is pushed to place the apparatus in the loading mode. Thereupon the motor for rotating the sprocket 18 starts rotating. This rotation of the motor causes the sprocket 18 to rotate, and the sprocket 20 is thereby driven through the belt 21. consequently, the lever 22 swings unitarily, rotating with the shaft 19 in the counterclockwise direction, from the position indicated by the full line in FIG. 1 to the position (the position indicated by full line in FIG. 2) indicated by single-dot and dashed line in FIG. 1.

As the lever 22 thus swings in the counterclockwise direction, the guide post 23 on the end of the lever 22, engages the tape 13, and extracts it from the opening 14, thereby drawings the tape 13 out of the cassette and through the opening in the front face thereof. When the lever 22 is in the state wherein it has swung to the position indicated by the single-dot and dashed line, the tape 13 is drawn out by the guide post 23 to form a tape loop 13*a* of approximately triangular shape, fixed by the pin 15, the guide post 23, and the pin 17, with the guide post 23 at the vertex of the triangle. During the above mentioned swinging of the lever 22, the guide pin 26 and the rotating ring 24 are in the state indicated in FIG. 1, and they are in vertical positions (relative to chassis 44) which are lower than the plane of rotation of the lever 22. For this reason, the swinging of the lever 22 is not obstructed by these parts, and the tape loop 13*a* is also at a position above these parts, relative to chassis 44.

When the lever 22 swings to the position indicated by the single-dot and dashed line in FIG. 1 (i.e., the position indicated by the full line in FIG. 2), a microswitch (not shown) operates in intercoupled relation thereto to cause the first motor for driving the sprocket 18 to stop and a second motor for driving the sprocket 46 to start. Alternatively, instead of providing the above mentioned microswitch and second motor, use may be made of a mechanism wherein, through the use of mechanical parts such cams, the sprocket 20 is rotated by a single motor while the lever 22 swings to the position indicated in FIG. 2, and, thereafter, the sprocket 46 is rotated.

When the sprocket 46 rotates in the above described manner, this rotation is transmitted by way of the belt 47 to the sprocket 39. The sprocket 39 and the driving roller 32 are thereby rotated unitarily in the counterclockwise direction. since the driving roller 32 is urged by the force of the spring 43 to press against the outer periphery of the rotating ring 24, the rotation of the roller 32 causes the ring 24 to rotate in the clockwise direction.

Since the rotating ring 24 is inclined as mentioned hereinbefore, the guide pin 26 and pinch roller 31 pass below the tape loop 13*a*, nearest the cassette 10. They enter into the loop, as viewed in plan view, as the ring 24 rotates. Then, as the ring 24 rotates further, the guide pin 26 also moves in rotation unitarily therewith. At the same time, the height position of the guide pin 26 progressively rises in accordance with the inclination of the ring 24. Then, as the guide pin 26 moves from the inner side of the tape loop 13*a* and again reaches a position to traverse the tape loop 13*a* as viewed in plan view, the guide pin 26 has risen to the same height position as the tape 13. For this reason, as the ring rotates further, the guide pin 23 engages the magnetic tape 13 on the inner side of the tape loop 13*a*, that is, on the surface, opposite the magnetic surface and undergoes rotational movement together with the ring 24.

Together with the rotation of the rotating ring 24, and following the guide pin 26, the guide pins 27, 28 and 29 also rotate and successively arrive at a position to traverse the portion of the tape loop 13*a* near the cassette 10. However, since these guide pins are also below the tape loop 13*a* as in the case of the guide pin 26, they enter into the tape loop 13*a* as they are as viewed in plan view. Then, as the ring 24 rotates further, the guide pins 27, 28 and 29 successively arrive at the position where the guide pin 26 previously engaged the tape 13. However, since the tape which was at this position has already been engaged and is being pulled by the guide pin 26 moving in rotation, the guide pins 27, 28 and 29 merely pass by this position and enter the loop 13.

As the guide pin 26 rotates, the tape 13 is pulled and thereby wrapped in contact with the peripheral surface of the guide drum 48. The wrap is over a specific range (an angular range slightly greater than 180° in the instant embodiment) defined by limits set by the guide posts 50 and 51. When the rotating ring 24 has rotated through approximately one revolution from the position indicated in FIG. 1 and reaches the position indicated in FIG. 2, a projection provided on the ring 24 actuates a microswitch (not shown), which thereupon stops the rotation of the motor for driving the sprocket 46. At this time, the pinch roller 31 is pressed against the capstan 53 with the tape 13 interposed therebetween. Alternatively, instead of the above mentioned projection and the microswitch, a mechanism wherein a cam causes the sprocket 46 to stop rotation automatically when it has rotated through a predetermined number of revolutions. When the sprocket 46 stops rotating, the recording and reproducing apparatus is switched over from the loading mode to the recording or reproducing mode. The capstan 53 thereupon rotates. At the same time, the rotating magnetic heads of the guide drum 48 also rotate.

When the rotating ring 24 stops in the state indicated in FIG. 2 as described above, the loading of the tape into its designed travel path is completed. The tape loop 13*b* in the tape travel path at this time is in the following state. The tape 13 supplied out of the supply spool 11 is guided out of the cassette 10 by the pin 15 and comes into contact with the full erasing head 49 to be erased over its entire width when the apparatus is in the recording mode (but it is not erased when the apparatus is in the reproducing mode).

The tape is then varied in height direction by a conical guide post 50. After being directed downwardly, it is wrapped around the guide drum 48, obliquely over the above described specific angular range determined by the guide posts 50 and 51. During this contact of the tape with the guide drum 48, video signals are recorded thereon or reproduced therefrom. The tape 13 makes further contact with the head block 52, where audio signals and control signals are recorded thereon or reproduced therefrom. Then, it arrives at the position between the capstan 53 and the pinch roller 31 to be driven thereby.

The tape 13 thus driven is guided by the guide pin 26 and is inverted through substantially 180 degrees in the advance direction. At the same time, the direction of the tape advance relative to the height direction is inverted. The tape 13 is guided by the guide pins 27, 28 and 29 as its height position progressively rises along the inclination of the guide ring 24. The direction of the tape 13 is changed to the horizontal direction by the inclined guide pin 29. After being guided by the guide post 23, it enters the cassette 10 at substantially the same height as the tape being sent out of the cassette.

The tape 13 thus returned to the interior of the cassette 10 is guided by the guide pin 17 and wound on the take-up spool 12 rotating in the counterclockwise direction. The tape being guided by the guide pin 26 and the tape directed toward the guide drum 48 from the cassette 10 appear to intersect in plan view in the vicinity of the guide pin 26. However, since their height positions are actually different, there is no possibility of their mutual interference.

When the cassette 10 is to be removed from the apparatus, the reject button (not shown) is pushed. Thereupon the apparatus assumes its unloading mode, and the above mentioned motor rotates in the reverse direction. All of the above described parts undergo a reverse operation in a sequence reverse to that at the time of operation according to the auto-loading mode. At the same time, the spool 12 (or 11) takes up the slack tape 13 outside of the cassette 10, whereby the tape is again completely accommodated within the cassette 10.

In the above described embodiment, the swinging lever 22 is adapted to rotate parallelly to the chassis base 44. However, by adapting the swinging lever 22 to move downwardly, as viewed in FIG. 3, as it swings, it is possible to reduce the angle of inclination of the rotating ring 24. In this case, a miniaturization of the apparatus becomes feasible.

The swinging lever 22 and the guide pin 23 are provided on the tape take-up side. The tape 13 passing by the guide pin 23 has already passed the guide drum 48, the capstan 53, the guide pins 27, 28 and 29 and other parts. For these reasons, even when there is some play in the swinging lever 22 and the guide pin 23, the effect of this play is cut off by the guide pins 29, 28 and 27, the capstan 53, the pinch roller 31, and other parts. Thus, no adverse effect is imparted to the tape part in contact with the guide drum 48 to undergo recording or reproducing.

In the above described embodiment, the number of rotating magnetic heads of the guide drum 48 is two, but this number is not so limited. It is possible to use any number of magnetic heads. In this case, the range or extent of contact of the tape around the guide drum is suitable selected in accordance with the number of heads.

Next, the invention will be described with respect to a second embodiment of the apparatus, according to FIGS. 4, 5, 6 and 7, in which parts which are the same as or equivalent to those shown in FIGS. 1, 2 and 3 are designated by like reference numerals, but a repeated detailed description thereof will be omitted at this point. The positions and positional relationships of the cassette 10, the rotating ring 24, the guide drum 48, the guide posts 50 and 51, the heads 49 and 52, the capstan 53, and other parts in FIGS. 4 and 5 differ slightly from those of the apparatus illustrated in FIGS. 1 and 2. However, since the functions of these parts are exactly alike in the two embodiments, the same reference numerals are used.

Figure 6:
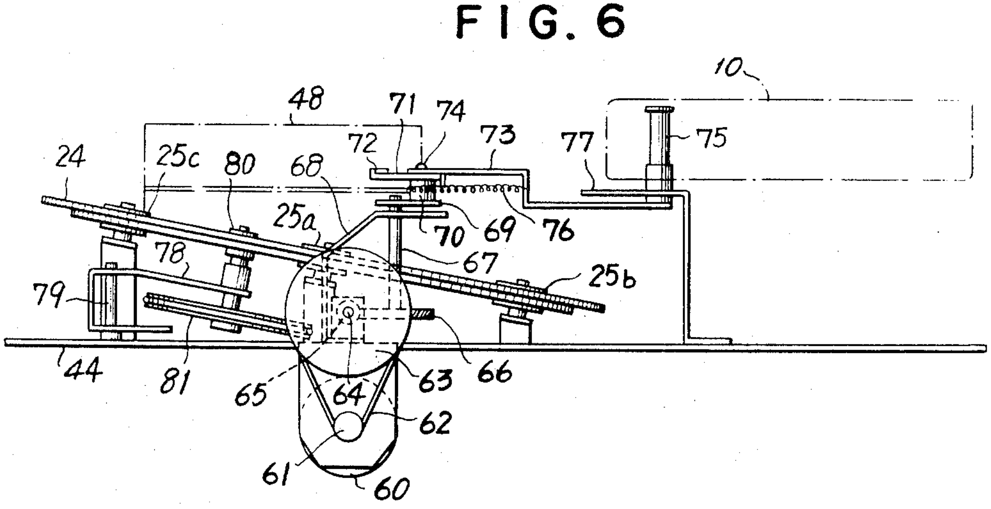
FIG. 6 is a side elevation of the apparatus shown in FIG. 4 as viewed from the left.
Figure 7:
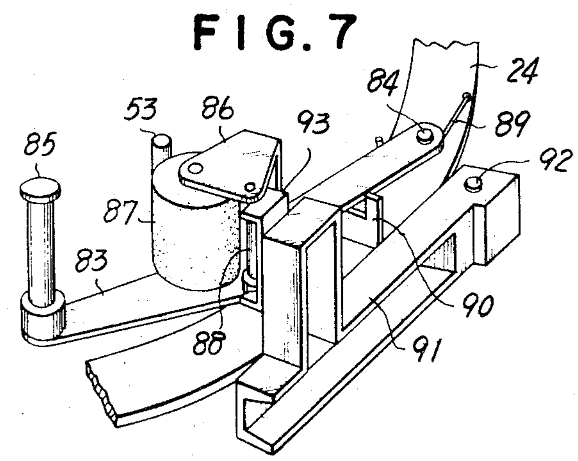
FIG. 7 is a fragmentary perspective view of a pinch roller, a guide post, a capstan, and related parts of the apparatus illustrated in FIG. 4.

The rotational power of a motor 60 is transmitted through a pulley 61, a belt 62, a pulley 63, a pulley shaft 64, a worm 65, and a worm gear 66 to a rotating shaft 67. The rotating shaft 67 is rotatably held by a holding bracket 68. At its upper end, it supports a lever 69 fixed thereto as shown in FIG. 6. A lever 71 is fixed by way of a bushing 70 to the extremity of the lever 69. The rotation of the rotating shaft 67 causes the lever 69, the bushing 70, and the lever 71 to rotate integrally. A projecting lug 72 is formed on one end of the lever 71. One end of a swinging lever 73, for drawing out the tape is pivoted on a shaft 74 inserted through the bushing 70 and fixed to the levers 69 and 71. At the distant end of the lever 73, there is a guide post 75 for drawing out and guiding the tape in the cassette. A tension spring 76 is stretched between the bushing 70 and the swinging lever 73 to urge the lever 73 to swing in the clockwise direction as viewed in FIG. 4.

A guide cam 77 is fixed to the chassis base 44 and has a straight-line part **77*a* and an arcuate part 77*b* for guiding the guide post 75. As viewed in plan view, the straight-line part 77*a* of the guide cam 77 and the cassette are superimposed, and the arcuate part 77*b* lies outside of the cassette 10**.

A swinging lever 78 is pivoted at one end on a shaft 79 to rotatably support, at its distant end, a driving roller 80, which is driven by a motor (not shown) through power transmission means. Roller 80 rotates integrally with a pulley 81. The lever 78 is continually urged in the clockwise direction by the force of a tension spring 82, stretched between this lever 78 and the chassis base 44. The driving roller 80 is thus pressed against the inner peripheral edge of the rotating ring 24.

A lever 83 is pivoted at one end thereof by a shaft 84 on the rotating ring 24 with an intentionally provided play (free movement). A guide post 85 is fixed to the distant end of this lever 83. A pinch roller 87 is rotatably supported by a bracket 86 fixed to a guide pin 88 on the upper face of this lever 83. The lever 83 is continually urged in the counterclockwise direction by a coil spring 89 disposed around the shaft 84 and fixed at one end thereof to the ring 24. The other end of spring 89 is a butting contact with the side surface of the lever 83. A stop 90 engages and holds the lever 83 at times other than when in the recording or reproducing mode. The stop 90 is fixed to the ring 24.

One end of a pinch roller pressing lever 91 is pivotally supported by a shaft 92 on the chassis base 44. A pressing member 93 is fixed to a projecting part of the distant of the lever 91. The upper and lower ends of the pressing member 93 are bent to form bent ends with a gap therebetween which is greater than the width of the tape 13. These bent ends are adapted to contact and press against the aforementioned guide pin 88. In the play mode of the apparatus, the pressing member 93 is separated from the pin 88.

The apparatus of the above described organization, according to the invention, operates in the following manner. When the apparatus is placed in the tape loading mode, the motor 60 starts to rotate. The rotating shaft 67 is driven in the counterclockwise direction. Consequently, the levers 69 and 71, and the shaft 74 swing integrally with the shaft 67 in the counterclockwise direction about the shaft 67. With the swinging of the lever 71 and the rotating of shaft 74, one end of the swinging lever 73 pivotally supported on the shaft 74 also undergoes integral rotational movement. However, since the lever 73 is being continually urged to swing in the clockwise direction by the spring 76, the guide post 75 is displaced in a state of contact with the guide cam 77, even when the end of the lever 73 undergoes a swinging movement. Consequently, as the end of the lever 73 undergoes a swinging movement around the shaft 67, the guide post 76 is guided by and in contact with the straightline part **77*a* of the guide cam 77 and moves in a straight-line. The guide post 75 then moves further to contact and press against the arcuate part 77*b***.

As the guide post 75, moving along the straightline part **77*a* and the arcuate part 77*b* of the guide cam 77, moves out of the cassette 10, the guide post 75, engages the tape 13, and gradually draws it out of the cassette 10. As the lever 71 swings in the counterclockwise direction through substantially half an arc, from the state indicated in FIG. 4, the lever 73 is in the position shown by single-dot dash line in FIG. 5. The guide post 75 arrives at a position in the vicinity of the end of the arcuate part 77*b* of the guide cam 77. At this time, the distance between the guide post 75 and the rotating shaft 67** is the minimum.

As the lever 71 continues its swing further in the counterclockwise direction from this operational direction, the projection 72 of the lever 71 pushes against the side surface of the swinging lever 73. Together with the counterclockwise movement of the lever 71, the lever 73 swings in the counterclockwise direction integrally with the lever 71. In the interval during which the lever 71 swings through approximately a 1/4 arc from the position indicated by the single-dot chain line in FIG. 5 to the position indicated therein by the full line, the lever 73 also swings integrally therewith. The guide post 75 draws the tape 13 at a rapid rate, forming a tape loop **13*a*** of substantially triangular shape as indicated by the two-dot chain line.

The center of rotation of the lever 73 is invariably the rotating shaft 67. Since the guide post 75 starts to swing at a position approaching the shaft 67 from the position indicated in FIG. 4 as designated by a single-dot chain line in FIG, 5, the swinging radius of the lever 73 has become small. Accordingly, the apparatus can be miniaturized by that much. Furthermore, during the initial half, arc of the swing of the lever 71, the guide post 75 draws the tape 13 gradually out of the cassette 10. Thereafter, a 1/4 arc of swing of the lever 71 causes the guide post 75 to draw the tape out with a higher speed to form a triangular tape loop. Therefore, there is no possibility of an infinitely large load being applied to the tape 13. Moreover, the tape drawing out operation can be carried out in a short time.

Figure 5:
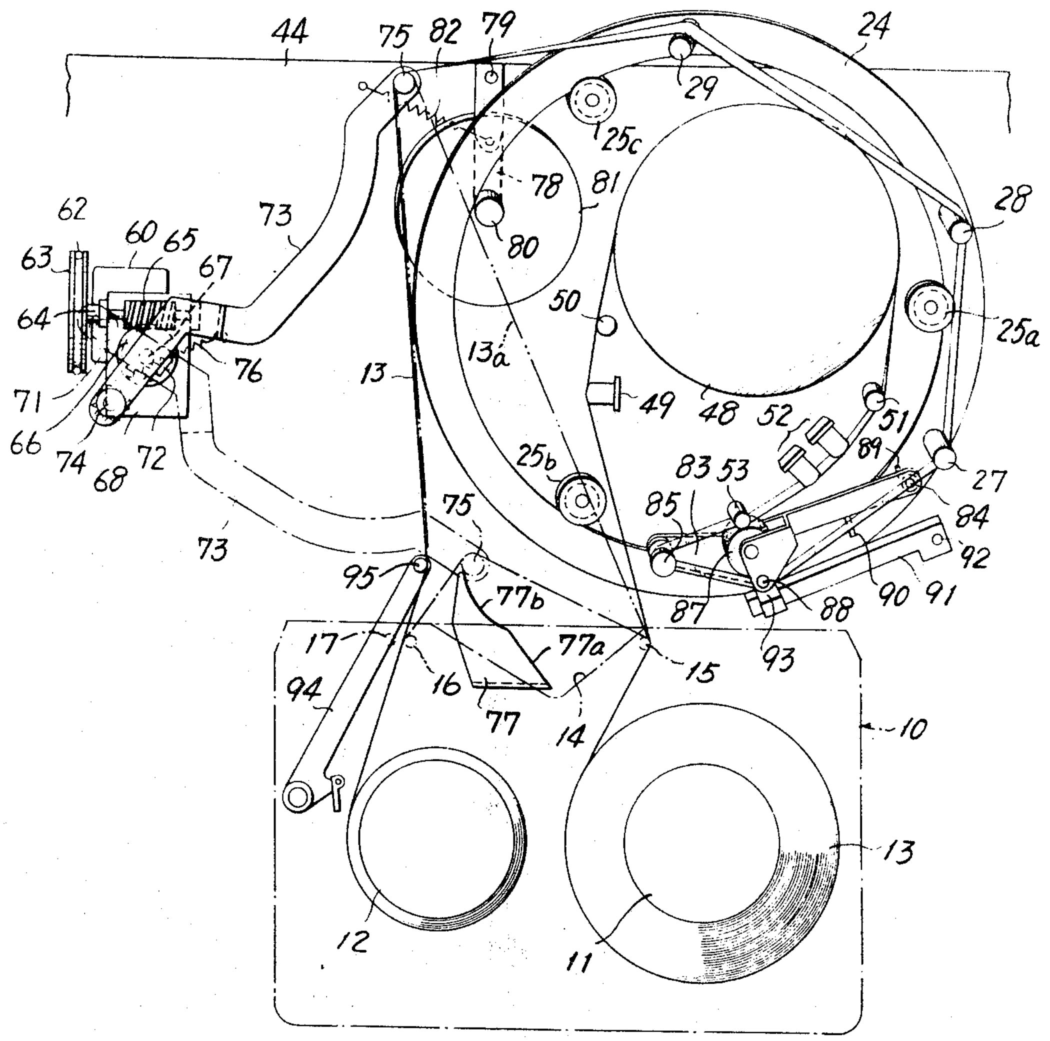
FIG. 5 is a plan view of the apparatus shown in FIG. 4 in the state at the completion of tape auto-loading.

When the swinging lever 73 reaches the position indicated by full line in FIG. 5, other motors start to rotate, whereby the driving roller 80 rotates, and the rotating ring 24 is thereby rotated. Together with the rotation of the inclined rotating ring 24, the guide post 85 enters into the tape loop 13a from therebelow. Then, as the guide post 85 reaches a position for emerging out of the loop, it engages the loop to pull it around. This operation is similar to that in the above described first embodiment.

The tape travel path at the time of completion of the tape auto-loading is as follows. The tape 13 which has been sent out from the supply spool 11 passes by the pin 15, the full erasing head 49 and the guide post 50. It is caused to wrap around the guide drum 48 over a specific range of angle. Thereafter, the tape 13 passes by the guide post 51 and the head block 52 and passes between the capstan 53 and the pinch roller 87. After being inverted in direction at the guide post 85, the tape 13 passes by the guide pins 88, 27, 28, and 29 and the guide post 75. Then, after passing further by a tension pole 95 fixed to the extremity of a tension lever 95 and the pin 17, the tape is wound on the take-up spool 12.

When the rotating ring 24 reaches its position indicated in FIG. 5, the auto-loading operation is thus completed. The driving roller 80 stops rotating, and, at the same time, the apparatus is switched from the auto-loading mode to the recording-reproducing mode. Accordingly, the capstan 53 rotates, and at the same time, a pinch roller pressing lever 91 is rotated in the clockwise direction by a known mechanism (not shown), such as a plunger. Together with the swinging of the lever 91, a pressing part 93 contacts and presses against the guide pin 88, causing the lever 83 to swing clockwise, counter to the force of the spring 89. As a result, the pinch roller 87 presses the tape 13 against the capstan 53.

Since the rotating ring 24 in this case is merely held rotatably by the guide rollers **25*a*, 25*b*, and 25*c*, there is some play in the rotating ring 24 itself, in actual practice. The axis of the pinch roller 87 cannot be maintained to be perfectly parallel to the axis of the capstan 53 at all times. In the instant embodiment, however, since the lever 83 is pivoted with some intentional play on the shaft 84. The pinch roller 87 presses against the capstan 53 with accurate parallelism when the pressing lever 91 presses the pinch roller 87 press to press against the capstan 53, even when the inclimation of the ring 24** is somewhat inaccurate.

Furthermore, at this time, the guide post 85 fixed to the lever 83 also becomes accurately and mutually parallel with the pinch roller 87 and the capstan 53. Consequently, the tape 13 is pinched and driven by the capstan 53 and the pinch roller 87, which are in full pressure contact. At the guide post 85, the tape 13 is guided smoothly without defective occurrences, such as uneven stretching.

At the time of tape unloading, the reject button is pushed. Thereupon the above described parts undergo an operation which is the reverse of that described above. After the rotating ring 24 has rotated in the counterclockwise direction through substantially one revolution, the swinging lever 73 swings through one-fourth arc from the position indicated by the full line in FIG. 5 to the position indicated by the single-dot chain line. At this time, the guide post 75 also rotates at high speed together with the swinging lever 73. The tape 13 is drawn into the cassette 10 by the rotation of the spool 12 (or 11), whereby the tape loop indicated by the two-dot chain line approaches the tape loop indicated by the single-dot chain line. Thereafter, during approximately one half an arc swing the lever 71, the guide post 75 moves along the guide cam 77 and gradually enters the opening 14 of the cassette 10. For this reason, the tape 13 during this period is sent positively into the cassette 10 without slackening. Accordingly, there is no possibility of a misoperation such as that wherein, in spite of the fact that the guide post 75 has been fitted into the opening 14, the tape 13 has not yet been completely wound up into the cassette 10 and is still outside of the cassette. If the cassette is taken out of the apparatus by error, the tape is not broken or damaged.

Figure 8:
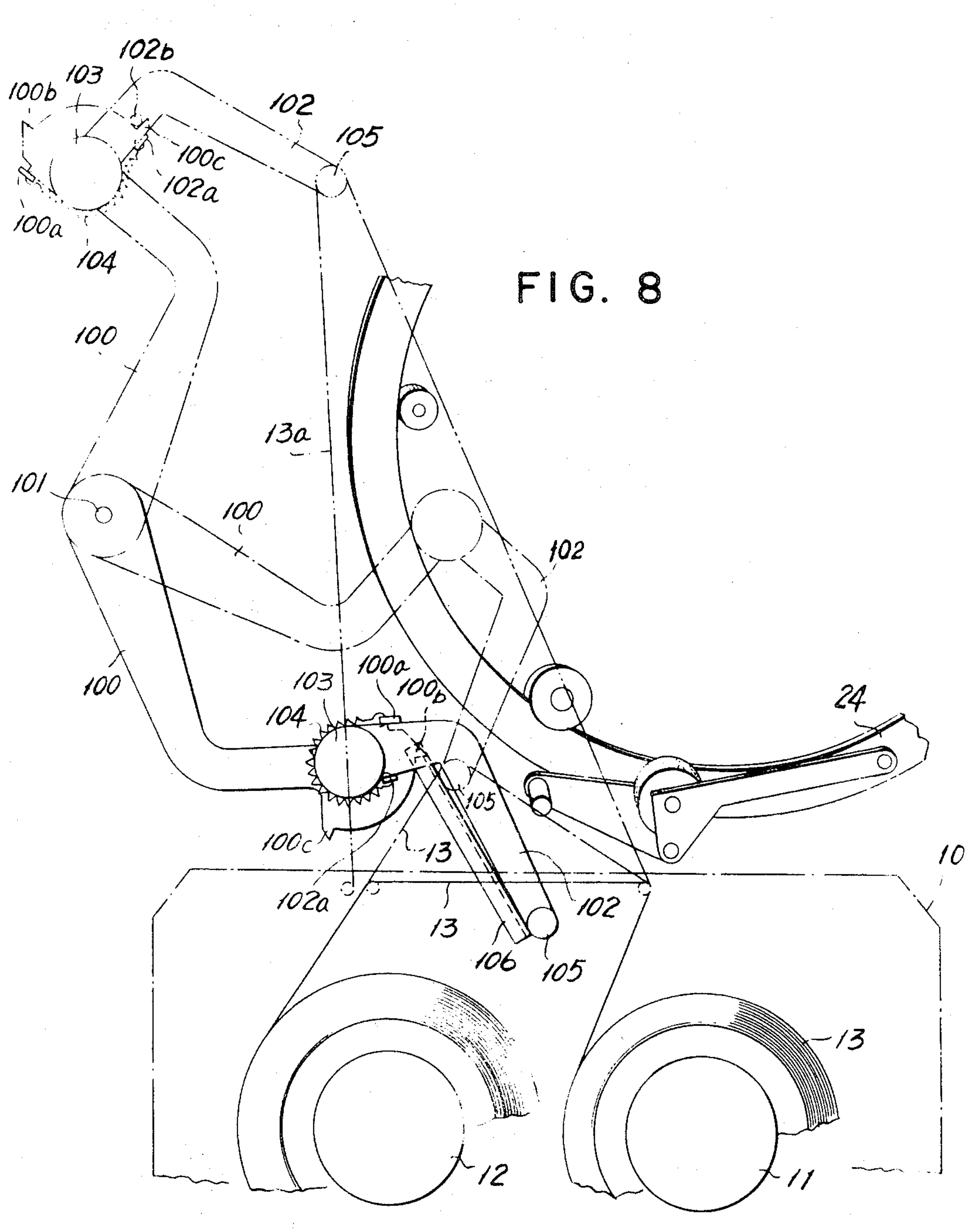
FIG. 8 is a plan view indicating various operational states of a modification of the tape drawing-out means according to the invention.

A modification of the swinging lever 73 for drawing out the tape and the related parts is illustrated in FIG. 8. A swinging lever 100 is fixed at one end thereof to a shaft 101 driven by power from a motor. A swinging lever 102, for drawing out tape, is pivotally supported at one end thereof to the other end of the lever 100 by way of a pulley 103. Between a projection 100*a* of the lever 100 and a projection 102*a* of the lever 102, there is stretched a spring 104 wrapped around the pulley 103. the lever 102 is thereby urged to swing in the clockwise direction by the force of the spring 104. A guide post 105 for drawing out a guiding tape is fixed to the distant end of the lever 102 and is guided in straight-line motion by a guide surface of a guide plate 106. Projections 100*b* and 100*c* of the lever 100 cooperate with a projection 102*b* provided on the lower side of the lever 102 to limit the swinging of the lever 102 within a specific range.

The above described mechanism operates in the following manner. When the auto-loading operation starts, the lever 100, together with the shaft 101, swings in the counterclockwise direction from the position indicated by full line. Thereupon one end of the lever 102 also swings together with the distant end of the lever 100. The lever 102 is caused by the force of the spring 104 to swing in the clockwise direction relative to the lever 100. During this operation, the guide post 105 moves in a straight line under the guidance of the guide plate 16 and draws out of the cassette 10 the tape indicated by the single-dot chain line. As the lever swings further in the counterclockwise direction, a projection 102*b* of the lever 102 and the projection 100*c* of the lever 100 become engaged. Thereby, the clockwise swing of the lever 102 is restricted. Thereafter, together with the swinging of the guide lever 100, the lever 102 swings in the counterclockwise direction, integrally with the lever 100, about the shaft 101. It reaches the position indicated by the two-dot chain line. The substantially triangular tape loop 13*a* is formed, as indicated by the two-dot chain line. The unloading operation is the reverse of the above described operation.

Next, a third embodiment of the tape auto-loading recording and reproducing apparatus, according to the invention, will be described with reference to FIGS. 9 and 10. Parts of the organization similar to those of equivalent parts shown in FIGS. 1, 2, and 3 are designated by like reference numerals, but repeated detailed description thereof will be omitted.

The rotating ring 24 is so inclined that its right-hand side (as viewed in FIG. 9) becomes its lowest part. A swinging lever 110 is fixed at one end thereof to the shaft 19 and supports at its other end a guide post 111 embedded therein for drawing out and guiding tape from the cassette 10. in symmetrical relation to the lever 110, there is provided a swinging lever 112 supported by a shaft 113. A guide post 114 is fixed to the distant end of the lever 112.

One end of a lever 115 and one end of a lever 116 are pivotally supported on the levers 110 and 112. The other ends of the levers 115 and 116 are pivotally connected to the two ends of a lever 117 provided to swing freely about a shaft 118. When the cassette 10 is fitted into place in the apparatus, the guide posts 111 and 114 fit into the opening 14 of the cassette 10 to the position on the inner side of the tape 13.

Figure 9:
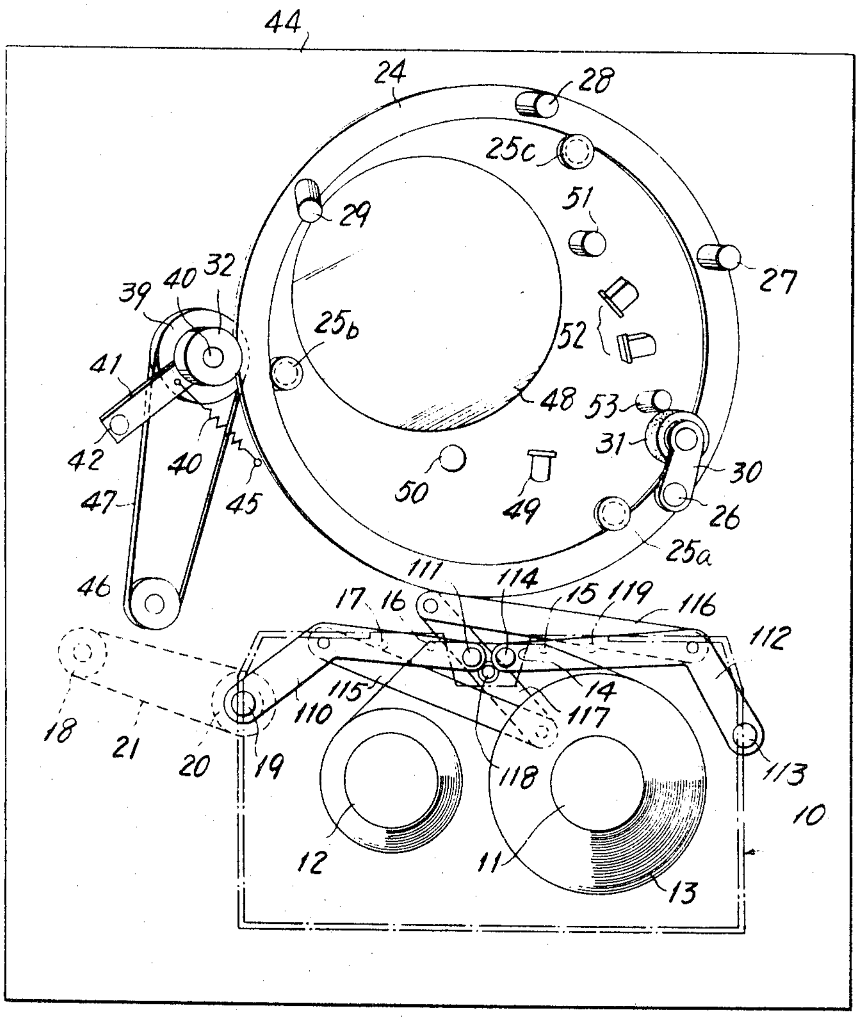
FIG. 9 is a plan view showing a third embodiment of the tape auto-loading recording and reproducing apparatus according to the invention.
Figure 10:
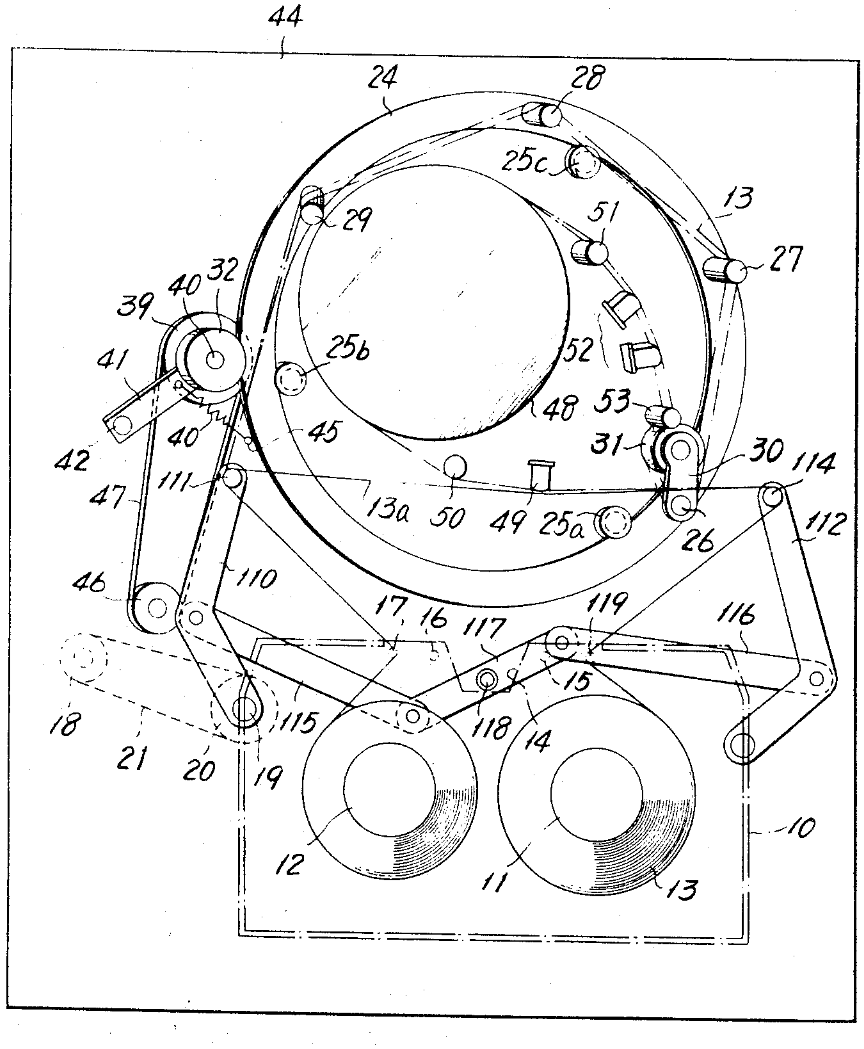
FIG. 10 is a plan view indicating the states of the apparatus illustrated in FIG. 9 during and upon completion of tape auto-loading.

When the apparatus is operated in the auto-loading mode, the sprocket 18 rotates, and the swinging lever 110 swings from the position indicated in FIG. 9 to that indicated in FIG. 10. Together with the swinging of the lever 110, one end of the lever 115 swings together with the lever 110. Consequently, the lever 117 swings in the clockwise direction, and this movement is transmitted by way of the lever 116 to turn the lever 112 in the clockwise direction. Accordingly, the guide posts 111 and 114 are in their mutually closest states in the case where they are within the cassette 10 shown in FIG. 9 but, with the swinging of the levers 110 and 112, swing and separate simultaneously in mutually opposite directions to assume their positions indicated in FIG. 10.

This swinging movement of the levers 110 and 112 causes the guide posts 111 and 114, in their state of engagement with the tape 13, to be extracted out of the cassette 10. Thereupon the tape 13 is caused to form the tape loop 13*a* as indicated by full line in FIG. 10. This tape loop 13*a* at this time is that part of the tape 13 extending from the supply spool 11, guided by the pin 119, the guide posts 114 and 111, and a pin 119, and reaching the take-up spool 12.

When, with apparatus in this state, the rotating ring 24 inclined downward to the right rotates, and the guide post 26 enters into the tape loop 13*a* from therebelow on the right side thereof and, engaging the tape in a part on the left side, rotates together with the ring 24. Consequently, as the ring 24 rotates through substantially one revolution, the tape 13 is loaded in the designed tape travel path similarly as in the preceding embodiments. In other respects, the operation is the same as that in the aforedescribed first embodiment.

Figure 11:
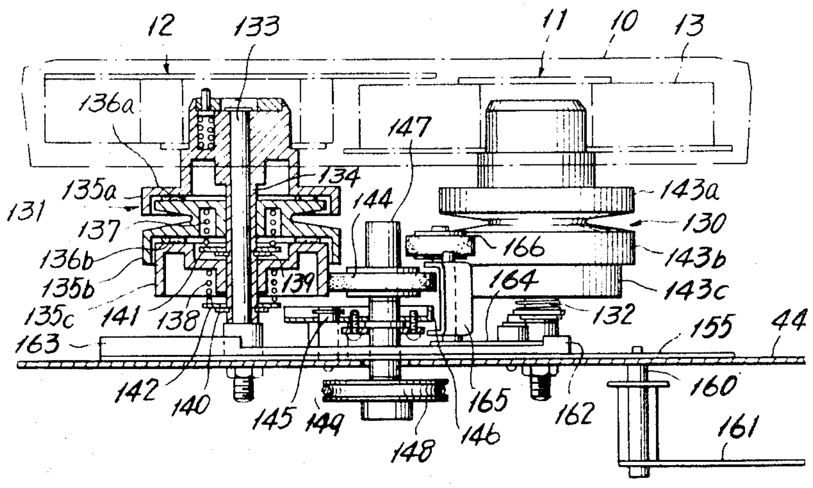
FIG. 11 is an elevation, mostly in vertical section, showing one embodiment of a tape fast forwarding or tape rewinding mechanism.
Figure 12:
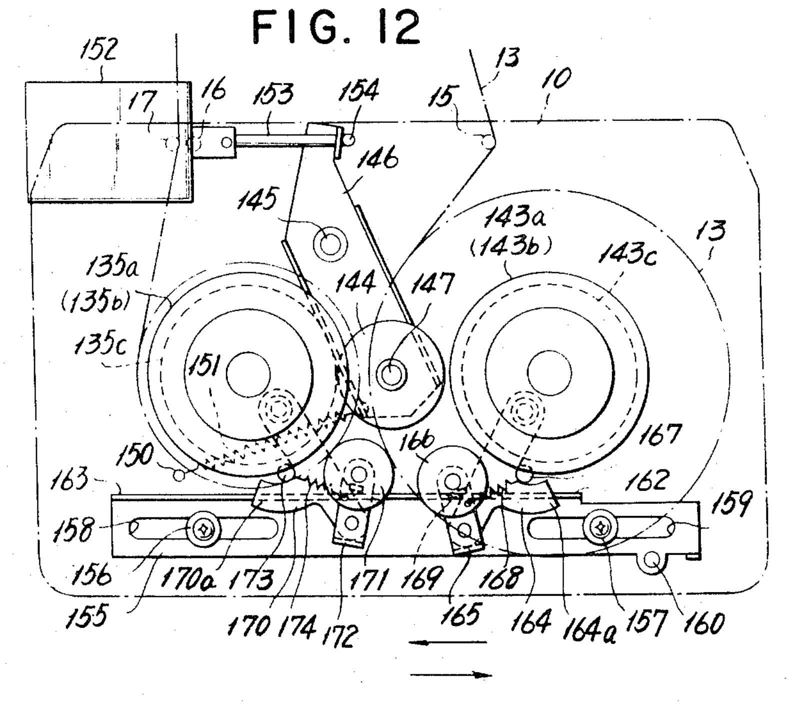
FIG. 12 is a plan view of the mechanism illustrated in FIG. 11 indicating its state of recording-reproducing mode.
Figure 13:
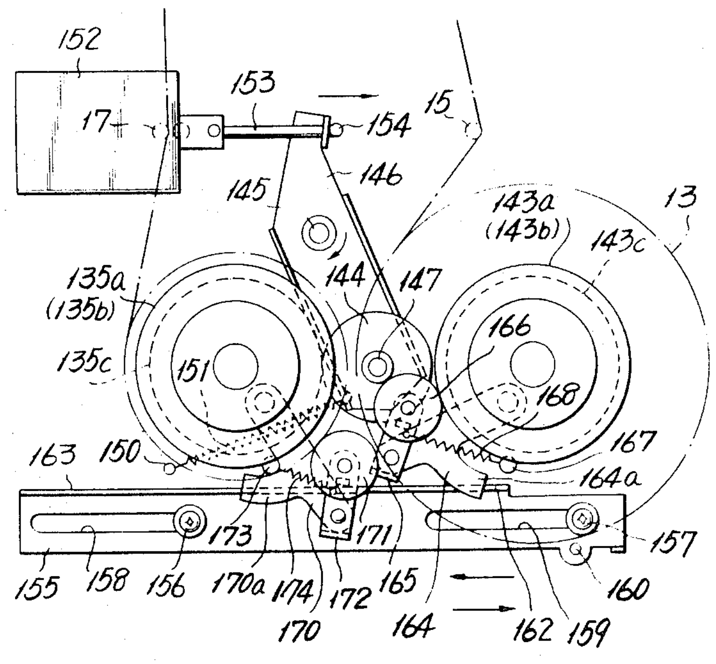
FIG. 13 is a plan view of the mechanism illustrated in FIG. 11 indicating its state of tape fast forwarding mode.

A tape fast forwarding or tape rewinding mechanism which can be used in the apparatus of the aforedescribed first and second embodiments will now be described with reference to FIGS. 11, 12, and 13. The tape travel path of the tape auto-loading recording and reproducing apparatus, embodying the invention as described hereinabove with respect to preferred embodiments thereof, is more complicated than that in an ordinary VTR, as is apparent from the accompanying drawings. Accordingly, when there is a necessity for causing the tape to travel at a high speed, as in the case of tape fast forwarding or tape rewinding, the tape tends to be subjected to excessive stress.

On conceivable method for overcoming this tendency, is to subject the tape 13 to unloading at the time of such operation. This causes it to be accommodated once within the cassette 10 and then to carry out tape fast forwarding or rewinding. By this method, however, it is necessary to subject the tape once to unloading and then again to loading. For this reason, it is not possible to carry out fast forwarding or rewinding operation within a short time. As a result, an inordinate time is wasted in carrying out fast forwarding or rewinding for only a short length of tape. When loading is again to be carried out, the reproducing starting position of the tape becomes different from that prior to unloading.

In accordance with the present invention, the above described problems and othe related problems have been solve by the organization of parts as described below. On the chassis base 44 of the recording and reproducing apparatus, there are provided a supply reel table 130 and a take-up reel table 131, rotatably supported respectively by spindles 132 and 133. The take-up reel table 131 comprises, as indicated by a section thereof, a bearing sleeve 134, an upper reel table 135*a* formed integrally therewith, an intermediate reel table 135*b*, and a lower reel table 135*c* fitted rotatably in the bearing sleeve 134. Between the upper reel table 135*a* and the intermediate reel table 135*b* and between the intermediate reel table 135*b* and the lower reel table 135*c*, there are respectively interposed friction members 136*a* and 136*b* made of a material, such as felt. The lower reel table 135*c* is of a diameter slightly smaller than the diameters of the upper and intermediate reel tables 135*a* and 135*b*. A spring 137 is provided between the intermediate reel table 135*b* and a washer 141 engaged with a projection 139 of the bearing sleeve 134. A spring 138 is provided between the lower reel table 135*b* and a washer 143 engaged with a projection 140. The reel tables 135*a*, 135*b*, and 135*c* are urged by the springs 137 and 138 in directions such that they are mutually pressed together. The supply reel table 130 also comprises upper, intermediate, and lower reel tables 143*a*, 143*b*, and 143*c* and has a structural organization similar to that of the take-up reel table 131.

Between the supply reel table 130 and the take-up reel table 131, there is disposed a driving roller 144, which is journalled in a manner permitting rotation thereof integrally with a rotating shaft 147 at the distant end of a swinging arm 146 capable of swinging about a shaft 145. The swinging shaft 147 extends through the swinging arm 146 to a point below the chassis base 44. To the lower end of this shaft 147, there is fixed a pulley 148 driven by a motor through an endless belt 149.

A spring 151 is stretched between the swinging arm 146 and a pin 150 fixed to the chassis base 44. The spring continually urges the arm 146 to swing in the clockwise direction. Accordingly, in the recording-reproducing operational mode, this arm 146 causes the driving roller 144 to press against the outer peripheral surface of the lower reel table 135*c* of the take-up reel table 131. The other end of this arm 146 is in pressing contact with an engagement pin 154 provided on the end of an actuating bar 153 of a plunger 152. In the above mentioned recording-reproducing mode, the plunger 152 is in an inoperative state, whereby the actuating bar 153 is not being attracted but is in the state indicated in FIG. 12.

A sliding bar 155 having longitudinal slots 158 and 159 near its left and right ends is guided by pins 156 and 157 fixed to the chassis base 44. It engages respectively with the slots 158 and 159 to slide in the left and right directions as viewed in FIGS. 11, 12, and 13. This sliding bar 155 is controllably moved in sliding movement by an actuating lever 161 fixed to a part of the sliding bar 155 by way of a pin 160. When the actuating lever 161 is not being moved, the sliding bar 155 is so positioned that the pins 156 and 157 are at the middle parts of the slots 158 and 159, respectively. One edge of the sliding bar 155 in its longitudinal direction is bent to form projecting ledges or flanges 162 and 163.

A swinging lever 164 is pivotally supported at one end thereof by the chassis base 44 and at its other pivotally supports one end of an arm 165. The lever 164 further has a curved projection 164*a*. On the other end of the arm 165, there is swingably supported a roller 166, the height position of which corresponds to the height position of the aforedescribed intermediate reel table 143*b*. The arm 165 is urged to swing in the clockwise direction by the force of a spring 168 stretched between the arm 165 and a pin 167 fixed to the chassis base 44. However, an engagement stop 169 provided on the lower surface of the arm 165 engages the side surface of the swinging lever 164, whereby the swinging of the arm 165 and the lever 164 are respectively limited.

A swinging lever 170 is pivotally supported at one end thereof on the chassis base 44 and at its other end pivotally supports an arm 172 provided with a freely rotatable roller 171. The arm 172 is urged to swing in the counterclockwise direction by a spring 174 stretched between it and a pin 173. When the above mentioned pins 157 and 158 are positioned respectively in the middle of the slots 158 and 159 of the sliding bar 155, the projecting flanges 162 and 163 of the sliding bar 155 are in light contact with projecting parts 164*a* and 170*a* of the swinging levers 164 and 170.

The mechanism of the above described organization operates in the following manner. First, in the recording-reproducing mode of operation, the rotational power of a motor is transmitted through the endless belt 149 to the pulley 148, whereby the driving roller 144 rotates together with the swinging shaft 147 in the clockwise direction as viewed in FIG. 12. The rotation of the driving roller 144 causes the lower reel table 135*c* of the reel table 131 pressed against the driving roller 144 to rotate. Thereupon the upper reel table 135*a* and the intermediate reel table 135*b* also rotate together. The take-up reel table 131 rotates in the counterclockwise direction. Consequently, the take-up spool 12 installed within the cassette 10 and mounted on the reel table 131 is rotated in the counterclockwise direction and thus winds the tape 13 recorded or reproduced.

when the apparatus is operated in the tape fast forwarding mode, the pinch roller of the apparatus separates from the capstan. At the same time, the actuating lever 161 is moved to move the sliding bar 155 to the left as viewed in the drawings. Thereupon the projection 162 pushes against the projection 164*a* of the swinging lever 164, which thereupon swings in the clockwise direction, overcoming the tension force of the spring 168. Together with the swinging of the lever 164, the arm 165 also moves counter to the tension force of the spring 168. The roller 166 presses against the intermediate reel table 143*b* and the rotating shaft 147.

Since the swinging shaft 147 is swinging in the clockwise direction, the roller 166 is rotating in the counterclockwise direction. The intermediate reel table 143*b* is rotating in the clockwise direction. This rotation of the intermediate reel table 143*b* causes the supply reel table 130 to rotate in the clockwise direction to cause the supply spool 11 of the tape cassette 10 to rotate in the clockwise direction. Consequently, the tape 13 wound around the supply spool 11 is sent out successively and positively. On the tape take-up side, the driving roller 144 is rotating in a state wherein it is pressed against the lower reel table 135*c* of the take-up reel table 131, whereby the take-up spool 12 on the take-up reel table 131 positively winds up the tape 13.

In this operation, since the tape 13 is positively sent out from the supply spool 11, the take-up spool 12 is subjected to almost no influence due to the tape travelling load of the tape travel system. By the winding rotational force of the take-up reel table 131, takes up the tape 13 smoothly. Moreover, at high speed, fast forwarding operation thereby being possible. When the tape 13 has been fed by fast forwarding over a specific length, the pressing force on the fast forwarding mode button is released. Thereupon the actuating lever 161 is moved to return the sliding bar 155 to its original position. The swinging lever 164 engaged by the projection 162 is swung in the counterclockwise direction by the tensile force of the spring 168. Accordingly, the roller 166 is released from the pressing action against the intermediate reel table 143*b*, and the rotating shaft 147, and thereby separates therefrom. Thus, the positive sending out of the tape 13 is terminated.

In the tape rewinding mode, the plunger 152 operates to draw the actuating bar 153. Since the arm 146 has one end engaged with the engagement pin 154 and swings in the counterclockwise direction, the driving roller 144 separates from the lower reel table 135*c* of the take-up reel table 131 and presses against the lower reel table 143*c* of the supply reel table 130. Furthermore, together with the operation of the above mentioned swinging arm 146, the actuating lever 161 operates. Consequently, the sliding bar 155 moves toward the right as viewed in the drawings. The projection 163 pushes the projection 170*a* of the swinging lever 170. Accordingly, the swinging lever 170 turns in the counterclockwise direction, overcoming the force of the spring 174, and the roller 171 presses against the lower reel table 135*c* of the take-up reel table 131 and against the rotating shaft 147.

As a consequence, the supply reel table 130 is rotated by the driving roller 144. The supply spool 11 positively winds up the tape 13. These movements are reverse to those occurring at the time of the above described tape fast forwarding mode. Furthermore, the take-up reel table 131 is rotated by the roller 171. The take-up spool 12 positively sends out the tape 13. Consequently, as in the case of the above described tape fast forwarding, the supply spool 11 is subjected to almost no influence of the load of the tape travel system. The tape taking up and rewinding of the supply spool 11 can be carried out smoothly at high speed.

The diameters of the driving roller 144, the rollers 166 and 171, and the reel tables 143*b*, 143*c*, 135*b*, and 135*c* are so selected that the rotational speed of the first spool will be of an order which is slightly slower than the tape take-up rotational speed of the other reel. This slowing occurs when one of the spools is positively sending out tape, and when almost all of the tape is wound on this one spool, whereby the wound tape diameter of this spool is the maximum, while that of the other spool is the minimum.

Further, this invention is not limited to these embodiments but various variations and modifications may be made without departing from the scope and spirit of the invention.

What we claim is:

1. A tape auto-loading recording and reproducing apparatus comprising: a guide drum having associated therewith at least one head mounted to rotate in a given plane; a tape cassette containing a tape and having a casing provided with a side opening extending over a small section on one side of said casing; at least one movable lever means having an associated tape drawing and guiding member which fits through a small opening in the bottom of the tape cassette and adjacent said side opening when said cassette is installed in said apparatus; means for moving said lever means through said side opening and out of said cassette in a manner such that said tape is drawn through said side opening and out of said tape cassette; a ring-shaped guide means surrounding said guide drum and rotatably supported with an inclination relative to said given plane in which said rotating head is mounted, said ring-shaped means and said guide drum being located at a position away from said opening of the tape cassette; at least one tape guiding member fixed to said ring-shaped guide means and disposed to be spaced apart from the tape to engage the tape drawn out of said tape cassette in response to the rotation of said ring-shaped guide means; rotating means operated responsive to a shift of said lever means for rotating said ring-shaped guide means over a predetermined angle on its plane of inclination whereby said guiding member on said ring-shaped guide means moves from an initial position, engages the tape drawn out of said tape cassette at a second position, and then pulls the tape to wrap around the peripheral surface of said guide drum with an inclination relative to the rotating plane of said rotating head; and means for driving said tape.

2. The tape auto-loading recording and reproducing apparatus as defined in claim 1 wherein said tape driving means comprises a capstan disposed at an inclination with respect to the width of the inclined tape and a pinch roller rotatably mounted on said ring-shaped member for pressing said inclined tape against said capstan in response to the rotation of said ring-shaped member over said predetermined angle.

3. The tape auto-loading recording and reproducing apparatus as defined in claim 1 wherein said tape cassette contains a supply reel and a take-up reel on which said tape is wound, said supply reel and take-up reel being arranged in a side-by-side relationship, and said movable lever means comprising a single movable lever, said means for moving said single lever drawing a guiding member to move toward the tape take-up reel side whereby the tape extends from the supply reel through the guide drum and then through the tape drawing and guiding member to the take-up reel.

4. The tape auto-loading recording and reproducing apparatus as defined in claim 1 wherein said movable lever means comprises two movable levers having respective tape drawing and guiding members which are disposed within the tape cassette in their mutually closed positions, said moving means for moving said two movable levers mutually apart to pull the tape out of the tape cassette by the respective tape drawing and guiding members.

5. The tape auto-loading recording and reproducing apparatus as defined in claim 1 further comprising a guide plate, and wherein said movable lever means comprises a first swinging lever having said tape drawing and guiding member at one end thereof, a second swinging lever pivotally supporting the other end of said first swinging lever on one end thereof, and means for urging said first swingable lever against said guide plate to keep said tape drawing and guiding member within the tape cassette; said lever moving means comprising means for swinging the other end of said second swinging lever in the direction opposite to the urging direction of said urging means whereby, while said second swinging lever swings through a predetermined angle, said tape drawing and guiding member moves along said guide plate to approach the axis of swing of the second swinging lever, and then swings integrally with the second swinging lever with the further swing of the second swinging lever.

6. The tape auto-loading recording and reproducing apparatus as defined in claim 2 wherein said tape driving means further comprises a lever pivotally supported with play at one end thereof on said ring-shaped member and provided at the other end thereof with said guiding member fixed thereto, said lever further rotatably supporting said pinch roller, and pushing means for urging said lever in such a direction that said pinch roller is pressed against said capstan, whereby when said lever is urged by the pushing means, parallelism of the capstan, the guiding member and the pinch roller is attained.

7. The tape auto-loading recording and reproducing apparatus as defined in claim 1 wherein said tape cassette contains a supply reel and a take-up reel on which said tape is wound, further comprising means for feeding tape by positively rotating said supply reel in response to a tape fast-forwarding mode of the apparatus and for positively rotating said take-up reel in response to a tape rewinding mode of the apparatus whereby the reel is positively sent out of the tape cassette.

8. The tape auto-loading recording and reproducing apparatus as defined in claim 1 wherein said rotating means comprises a driving roller inclined at an angle similar to the inclination of said ring-shaped member, said rotating means pressing against a part of said ring-shaped member, and means for rotating said driving roller in response to the shift of said swinging lever means to said predetermined position by said moving means.

* * * * *